(12) United States Patent
Barmichev et al.

(10) Patent No.: US 8,596,580 B1
(45) Date of Patent: Dec. 3, 2013

(54) ADVANCED PERFORMANCE REFUELING BOOM

(75) Inventors: Sergey D. Barmichev, Bothell, WA (US); Harry Wilbert Slusher, Fountain Valley, CA (US)

(73) Assignee: The Boeing Company, Chicago, IL (US)

(*) Notice: Subject to any disclaimer, the term of this patent is extended or adjusted under 35 U.S.C. 154(b) by 375 days.

(21) Appl. No.: 12/891,394

(22) Filed: Sep. 27, 2010

(51) Int. Cl.
*B64D 39/00* (2006.01)

(52) U.S. Cl.
USPC .................. 244/135 A; 244/1 TD; 244/135 R

(58) Field of Classification Search
USPC .................. 244/1 TD, 135 A, 135 R
See application file for complete search history.

(56) References Cited

U.S. PATENT DOCUMENTS 4,586,683 A * 5/1986 Kerker ...................... 244/135 A
5,499,784 A * 3/1996 Crabere et al. ............ 244/135 A

OTHER PUBLICATIONS

Website entitled "Defense, Space & Security KC-10 Extender" from http://www.boeing.com/defense-space/military/kc10/index.html, obtained on Sep. 27, 2010; 2 pages.

Website entitled "KC-10 Extender" from http://www.globalaircraft.org/planes/kc-10_extender.pl, obtained on Sep. 27, 2010; 3 pages.
Website location http://www.defense.gov/dodcmsshare/newsphoto/2006-08/hires_060725-F-2034C-013.jpg, obtained on Sep. 27, 2010, 1 page.

* cited by examiner

*Primary Examiner* — Timothy D Collins
*Assistant Examiner* — Jamie S Stehle
(74) *Attorney, Agent, or Firm* — Hope Baldauff, LLC

(57) ABSTRACT

Apparatuses, systems, and methods described herein provide for a refueling boom having vertical control surfaces extending primarily downward below the horizontal control surfaces out of the auxiliary power unit (APU) exhaust and airframe-induced turbulent flow fields, while reducing the torque moments applied to the boom beam and increasing control authority. According to one aspect of the disclosure provided herein, a refueling boom includes a boom beam, at least one horizontal control surface, and a pair of vertical control surfaces. The vertical control surfaces are positioned on opposing ends of the horizontal control surfaces and each include an upper portion and a longer lower portion projecting downward below the horizontal control surface. Aspects further improve the aerodynamic characteristics of the boom beam, reducing the drag associated with the refueling boom.

18 Claims, 11 Drawing Sheets

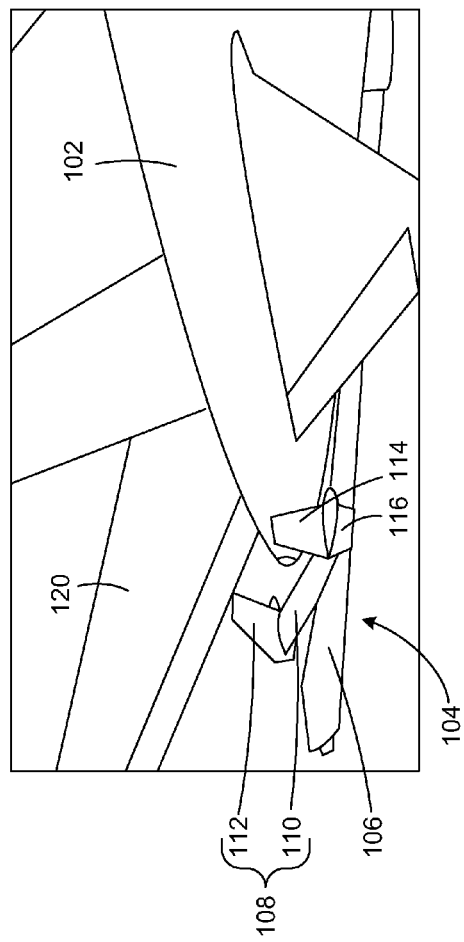
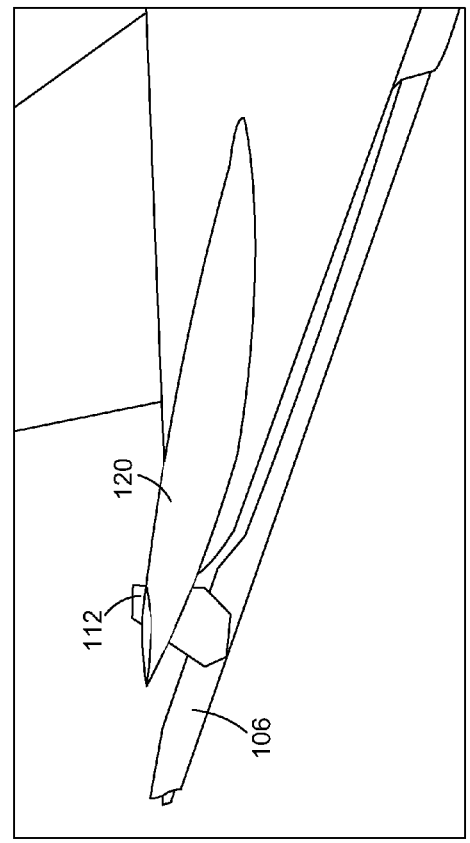

ADVANCED PERFORMANCE REFUELING BOOM

BACKGROUND

Tanker aircraft utilize refueling booms to transfer fuel from tanks within the tanker aircraft to aircraft receiving the fuel while in-flight. Conventional refueling booms are pivotally mounted at one end to the tanker aircraft and typically include a telescoping nozzle with a connector at the opposite end of the boom that connects to a corresponding receptacle of the receiving aircraft. Once connected, fuel is transferred from the tanks within the tanker aircraft to the receiving aircraft via the boom.

Refueling booms are designed to rotate upwards to the tail of the tanker aircraft for stowage in a position that does not interfere with rotation of the tanker aircraft during takeoff operations and to minimize drag on the aircraft when not in use. During refueling operations, typical refueling booms are designed to rotate downwards in position for mating with the receiving aircraft and for transferring fuel. To aid in the process of mating the boom nozzle to the receiving aircraft, conventional booms include control surfaces mounted to the boom that can be manipulated by an operator aboard the tanker aircraft to "fly" the boom as necessary to align the nozzle with the receptacle of the receiving aircraft.

Conventional control surfaces for a refueling boom may include a pair of V-shaped surfaces, or ruddervators, that can be moved independently to control the movement of the boom. Alternatively, some refueling booms have control surfaces that include at least one horizontal control surface for controlling the pitch of the boom, and a pair of canted vertical control surfaces attached to opposing ends of the at least one horizontal control surfaces that are used to control the roll and yaw of the boom. These vertical control surfaces extend substantially upwards from the at least one horizontal control surfaces, with a majority of the vertical surfaces above the horizontal surfaces.

This upward configuration of the vertical control surfaces creates several undesirable results. First, when the refueling boom is stowed and the tanker aircraft is operating on the ground with the auxiliary power unit (APU) running, the exhaust of the APU flows over the at least one horizontal control surfaces and between the vertical control surfaces. If a sufficient cross-wind exists, this APU exhaust can be pushed over a vertical control surface, undesirably heating and buffeting the control surface, potentially leading to premature material failure or defects due to material fatigue.

Second, during cruise flight of the tanker aircraft, ambient airflow over the horizontal stabilizers and elevators of the aircraft creates a turbulent flow aft of the elevator root area. When the refueling boom is stowed during cruise flight, the upward extending vertical control surfaces of the conventional refueling boom may be positioned within this turbulent flow field, creating undesirable buffeting that stresses the control surfaces, which creates additional parasite drag and also could contribute to premature failure or defects. Third, the conventional configuration of the vertical control surfaces positions the aerodynamic center of these surfaces above the refueling boom, which imposes a torque moment on the boom beam, requiring structural solutions that increase the weight of the boom.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatuses, systems, and methods described herein provide for an improved refueling boom having vertical control surfaces that are not subjected to stresses due to APU exhaust or turbulent flow fields from the tanker aircraft and that reduce the torque moments applied to the boom beam. Aspects further improve the aerodynamic characteristics of the boom beam, reducing the drag associated with the refueling boom.

According to one aspect of the disclosure provided herein, a refueling boom includes a boom beam, at least one horizontal control surface, and a pair of vertical control surfaces. The one or more horizontal control surfaces are positioned on the boom beam with the vertical control surfaces positioned on opposing ends. The vertical control surfaces each include an upper portion projecting upwards from the horizontal control surface and a lower portion projecting downward from the horizontal control surface. The length of the lower portion of each vertical control surface is greater than the length of the upper portion.

According to another aspect, a tanker aircraft includes a fuselage, a fuel tank, and a refueling boom attached to the fuselage and fluidly linked to the fuel tank for transferring fuel to a refueling aircraft. The refueling boom includes a boom beam and control surfaces for aerodynamically controlling the movement of the boom beam. The control surfaces include at least one horizontal control surface and a pair of vertical control surfaces. The vertical control surfaces are positioned on opposing ends of the horizontal control surfaces and each include an aerodynamic center that is positioned below the horizontal control surfaces.

According to yet another aspect, a method for controlling an aircraft refueling boom of a tanker aircraft includes actuating one or more horizontal control surfaces positioned above the boom beam of the refueling boom and actuating a pair of canted vertical control surfaces positioned on opposing ends of the horizontal control surfaces. Actuating the horizontal control surfaces alters the ambient airflow pressure over the horizontal control surfaces, causing the boom beam to move around a pitch axis. Actuating the vertical control surfaces alters the ambient airflow pressure at an aerodynamic center of each vertical control surface located below the horizontal control surface, causing the boom beam to move around a roll axis.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 1A and 1B are perspective and side views, respectively of a tail portion of a tanker aircraft showing a conventional refueling boom configuration;

DETAILED DESCRIPTION

Figure 2:
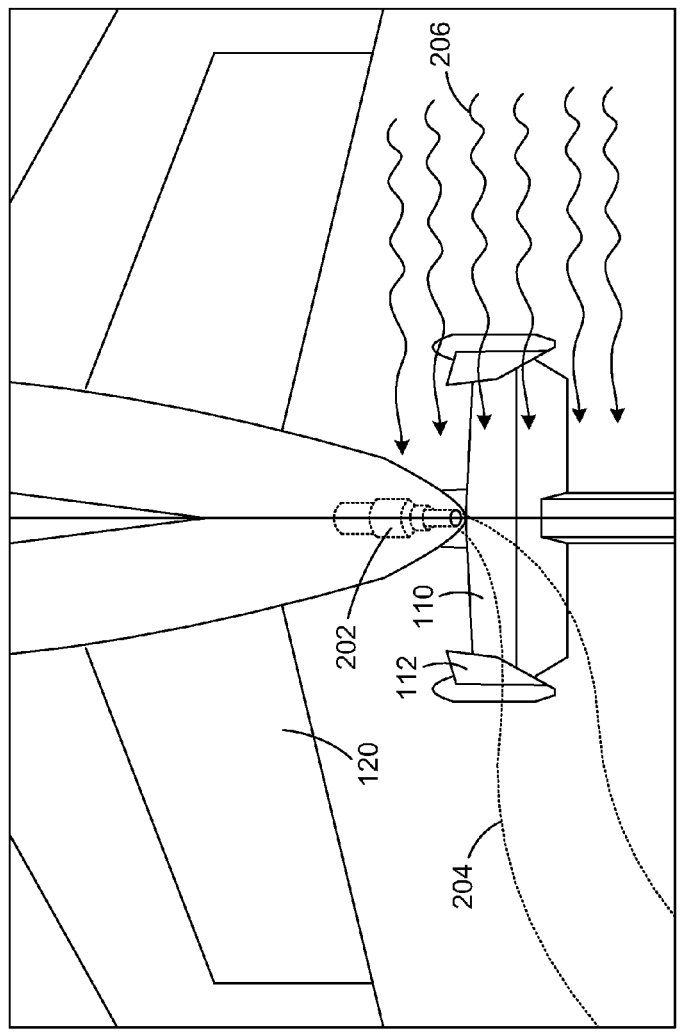
FIG. 2 is a top view of a tail portion of a tanker aircraft showing the effects of an auxiliary power unit (APU) exhaust stream in a cross wind on a conventional refueling boom in a stowed configuration.

The following detailed description is directed to refueling booms, tanker aircraft, and methods for providing an aircraft refueling boom of a tanker aircraft. As discussed briefly above, conventional refueling booms often include vertical control surfaces that are subject to material fatigue and increased drag due to undesirable interaction with the exhaust streams of auxiliary power units (APUs) and with turbulent flow fields created by the horizontal stabilizers and elevators of the tanker aircraft to which the booms are attached. In the following detailed description, references are made to the accompanying drawings that form a part hereof, and which are shown by way of illustration, specific embodiments, or examples. Referring now to the drawings, in which like numerals represent like elements through the several figures, a refueling boom with enhanced vertical control surfaces will be described.

However, before describing the various embodiments disclosed below for resolving these issues, the conventional refueling boom configurations and associated disadvantages will be described with respect to FIGS. 1A-3B for illustrative comparative purposes. FIGS. 1A and 1B show a tanker aircraft 102 having a conventional refueling boom 104 with control surfaces 108 attached to a boom beam 106. As described briefly above, the control surfaces 108 include one or more horizontal control surfaces 110 and conventional vertical control surfaces 112 attached to opposing ends of the horizontal control surfaces 110. The conventional vertical control surfaces 112 may include an upper portion 114 that projects upwards above the horizontal control surfaces 110 and a lower portion 116 that projects downward below the horizontal control surfaces 110.

The upper portion 114 of the conventional vertical control surfaces 112 are longer than the lower portion 116, resulting in a control surface 108 that generally extends upwards from the boom beam 106, resting aft of the tail and horizontal stabilizers 120 of the tanker aircraft 102 when the boom is in a stowed configuration. As described above, this positioning has undesirable consequences. One consequence is shown in FIG. 2, where the APU 202 for the tanker aircraft 102 is shown in the typical installation location in the tail of the aircraft. When operating while the aircraft is on the ground, the APU 202 creates an APU exhaust stream 204 that flows over the conventional refueling boom 104, generally between the conventional vertical control surfaces 112.

However, aircraft are commonly subjected to crosswinds during ground operations, as well as during flight. In this scenario, the tanker aircraft 102 is on the ground with the APU 202 operating, while subjected to a crosswind 206. As seen in FIG. 2, the crosswind 206 forces the APU exhaust stream 204 over the conventional vertical control surface 112. In doing so, the vertical control surface 112 is subjected to undesirable heat and stress.

Figure 3A:
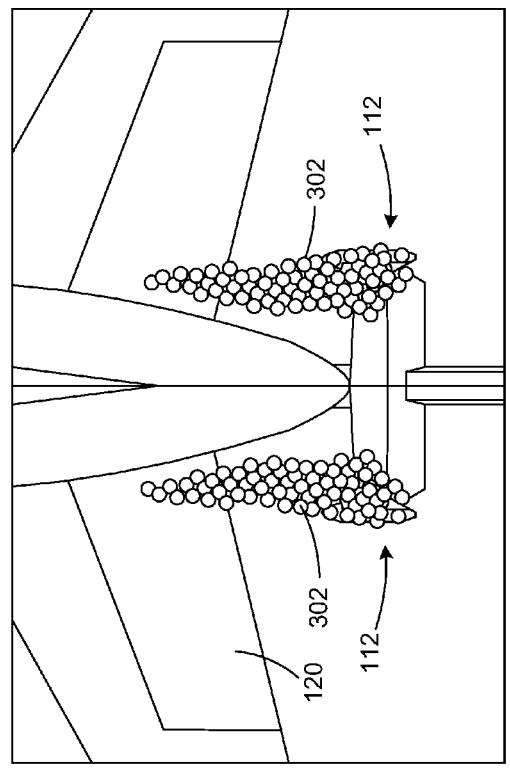
FIGS. 3A and 3B are top and side views of a tail portion of a tanker aircraft showing the effects of a turbulent flow field produced by the tanker aircraft on a conventional refueling boom in a stowed configuration.
Figure 3B:
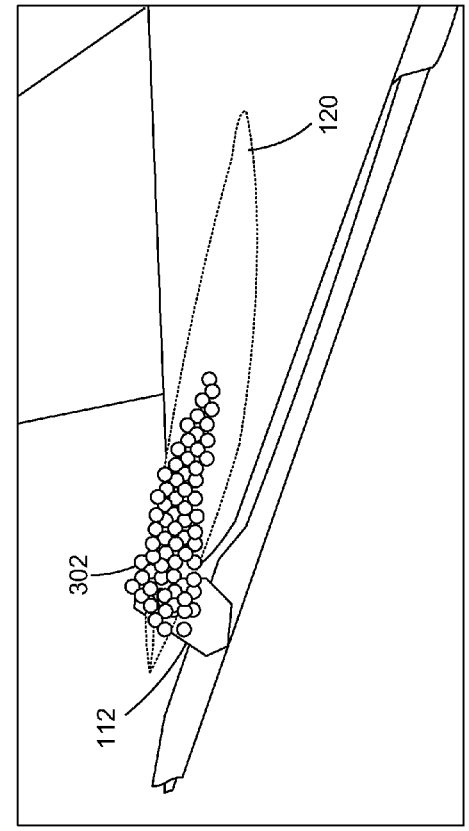

FIGS. 3A and 3B further illustrate an undesirable consequence of the upwardly extended configuration of the conventional vertical control surfaces 112. During cruise flight and other flight conditions, the horizontal stabilizers 120 and/or elevators of the tanker aircraft 102 create turbulent vortices, or a turbulent flow field 302. The conventional vertical control surfaces 112 are exposed to this turbulent flow field 302, which not only creates undesirable drag on the aircraft, but also stresses the surfaces and creates a potential for material fatigue and failure.

Figure 4B:
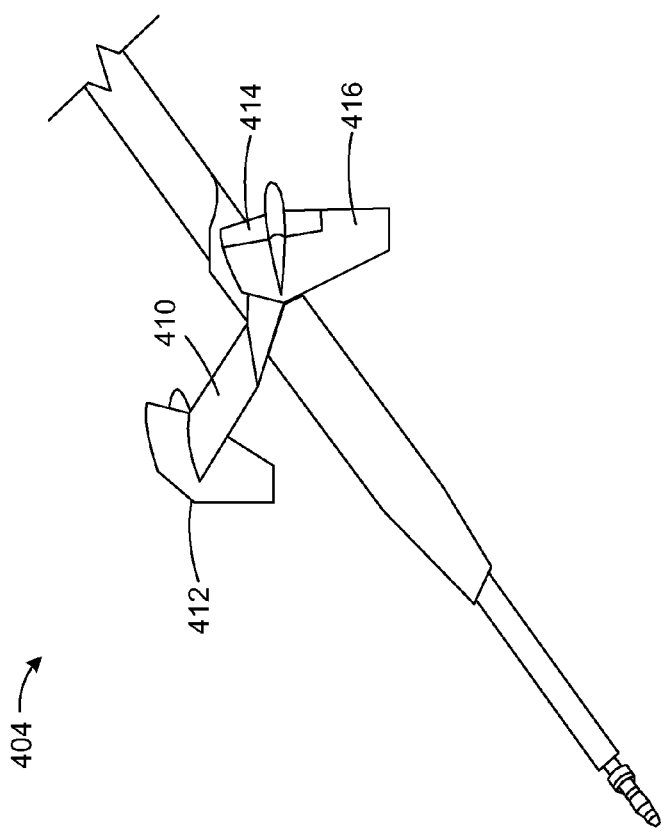
FIGS. 4A and 4B are front and perspective views, respectively, of a refueling boom in a deployed configuration according to various embodiments presented herein.
Figure 4A:
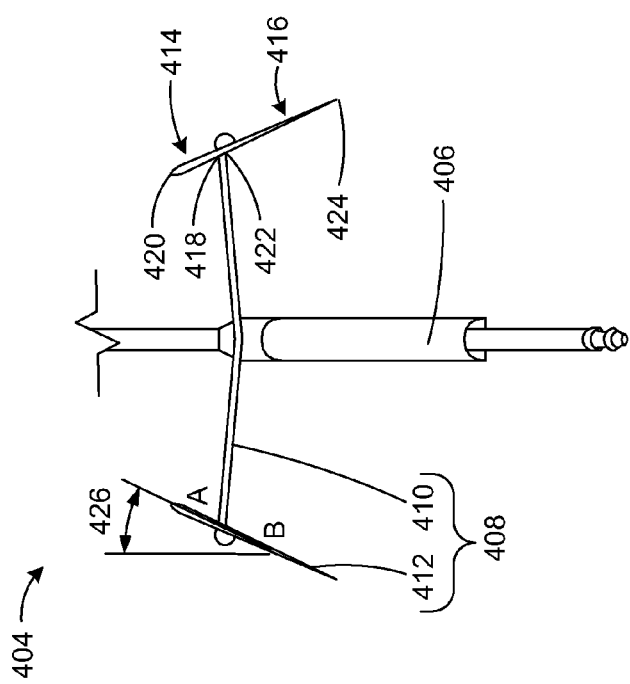

Turning now to FIGS. 4A and 4B, a refueling boom 404 according to various embodiments will now be described. According to this embodiment, the refueling boom 404 includes a boom beam 406 with control surfaces 408 attached. The control surfaces 408 include one or more horizontal control surfaces 410 and a pair of vertical control surfaces 412. The horizontal control surfaces 410 may include a single or a pair of horizontal surfaces and/or elevators that rotate together or independently to control the vertical movement of the refueling boom 404 around a pitch axis. The pair of vertical control surfaces 412 is attached to opposing ends of the horizontal control surfaces 410. The vertical control surfaces 412 include an upper portion 414 that projects upwards above the horizontal control surfaces 410 and a lower portion 416 that projects downward below the horizontal control surfaces 410.

The vertical span of the vertical control surfaces 412 includes the length A of the upper portion 414 plus the length B of the lower portion 416. Length A spans between an upper root edge 418 to an upper tip edge 420, while length B spans between a lower root edge 422 to a lower tip edge 424. The precise lengths A and B, as well as the overall length of the vertical span of the vertical control surfaces 412, may differ according to the specific implementation. However, according to embodiments presented herein, the ratio of A/B is less than one. In other words, the length B of the lower portion 416 of each vertical control surface 412 is longer than the length A of the upper portion 414 of the vertical control surface 412.

As seen in FIG. 4A, the vertical control surfaces 412 cant outward at an unhedral angle 426 away from the boom beam 406 in a direction from the upper tip edge 420 to the lower tip edge 424. In doing so, the pivoting surfaces of the vertical control surfaces, or rudders, create aerodynamic forces at an angle to the boom beam 406 that enables an operator to move the refueling boom 404 in a rolling arc-like motion, which along with the pitch control from the horizontal control surfaces 410, provides full control of the movement of the refueling boom 404 throughout the boom operating envelope. In fact, the configuration of the refueling boom 404 with the downwardly oriented vertical control surfaces 412 provides for increased control authority over the boom movement as compared to the conventional refueling boom 104, as will be described in greater detail below with respect to FIGS. 6 and 7.

Figure 5:
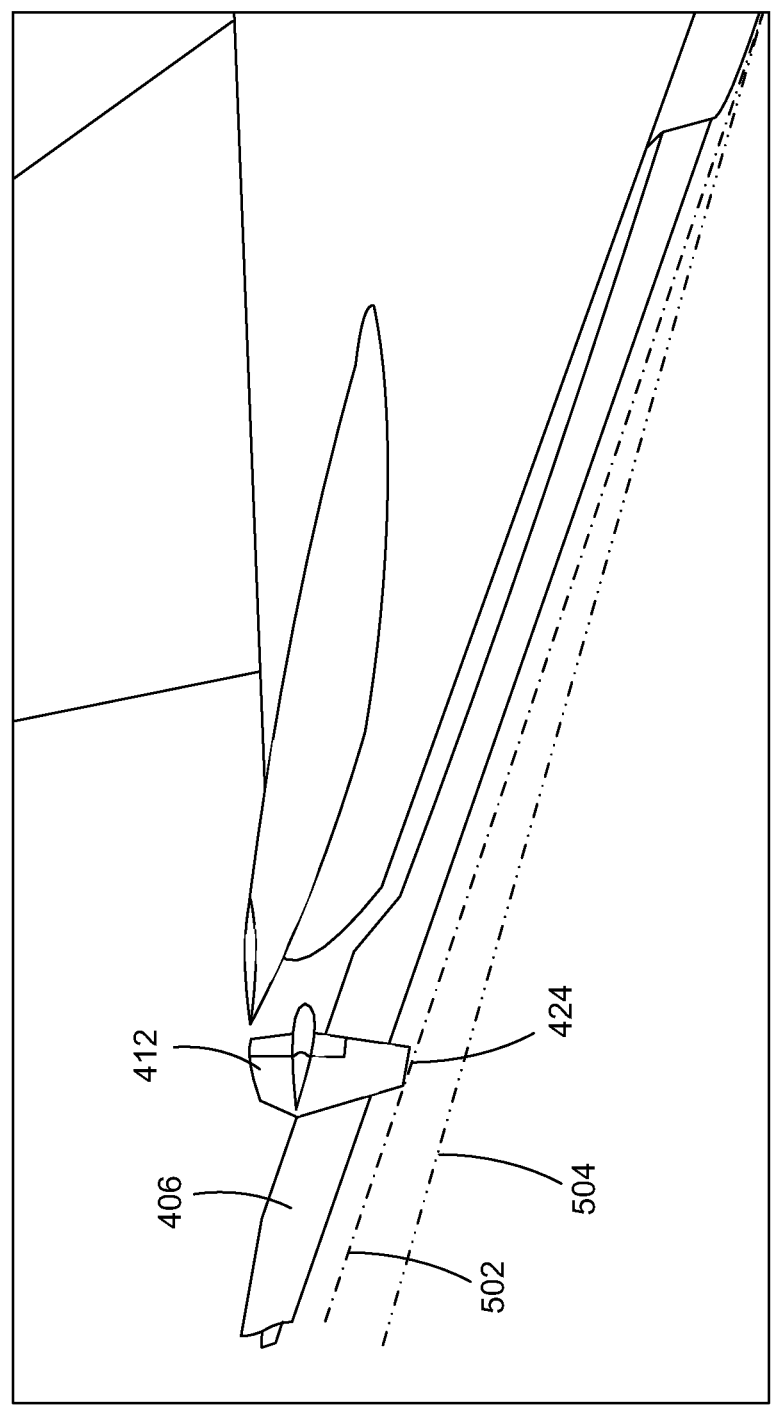
FIG. 5 is a side view of a rear portion of a tanker aircraft with a refueling boom in a stowed configuration showing a rotation clearance angle with respect to a refueling boom according to various embodiments presented herein.

Referring now to FIG. 5, it will become clear that the configuration of the refueling boom 404 does not negatively impact the rotation angle of the tanker aircraft 102 with respect to ground clearance. FIG. 5 shows two lines, 502 and 504. Line 502 represents the lowest point of the refueling boom 404 that must clear the ground when the tanker aircraft 102 rotates during takeoff. It should be understood that depending on the specific implementation, the lower tip edge 424 of the vertical control surfaces 412 may or may not extend below a plane parallel with and containing the boom beam 406.

Line 504 is tangential to a boom fitting fairing on the fuselage to which the refueling boom 404 is attached. The boom fitting fairing is unchanged from conventional fairings to which a conventional refueling boom 104 would be attached. Because line 502 is above line 504, it can be seen that the configuration of the refueling boom 404, in which the vertical control surfaces 412 are oriented in a substantially downwards direction from the horizontal control surfaces 410, does not impact the rotation angle of the tanker aircraft 102 since the boom fitting fairing would contact the ground prior to the refueling boom 404.

Figure 6:
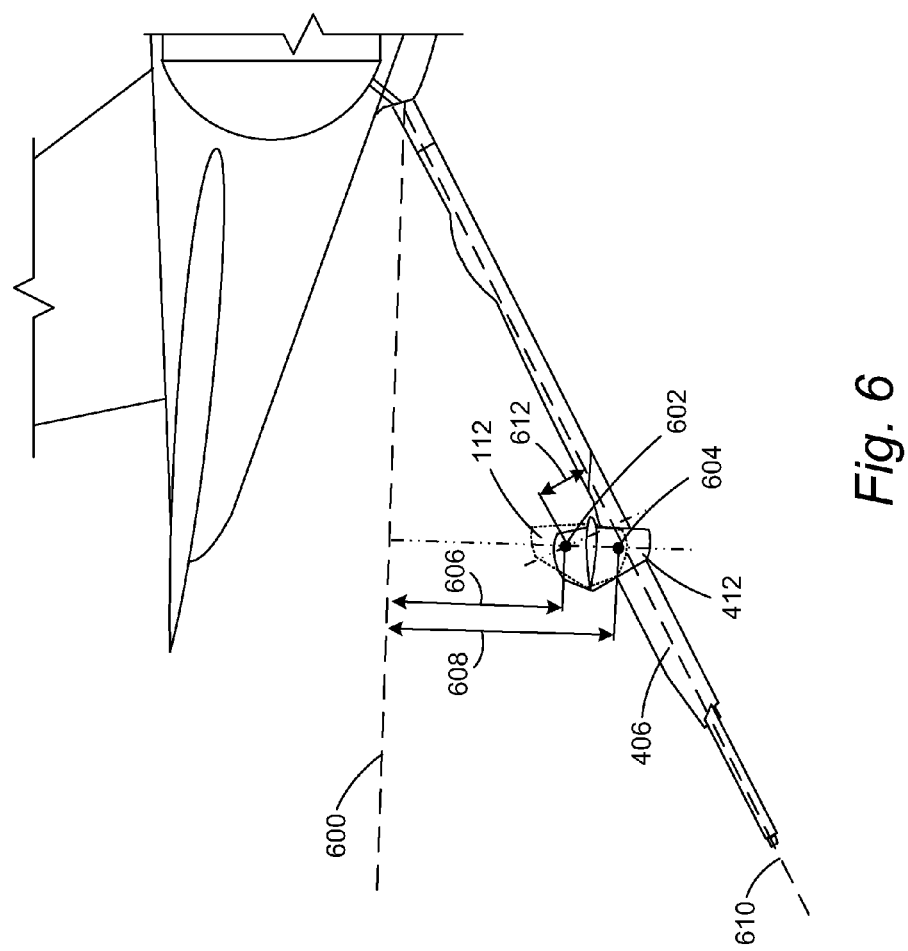
FIG. 6 is a side view of a rear portion of a tanker aircraft with a refueling boom in a deployed configuration showing a comparison of aerodynamic center positioning and associated roll moment effects between a refueling boom with conventional vertical control surfaces and with vertical control surfaces according to various embodiments presented herein.
Figure 7:
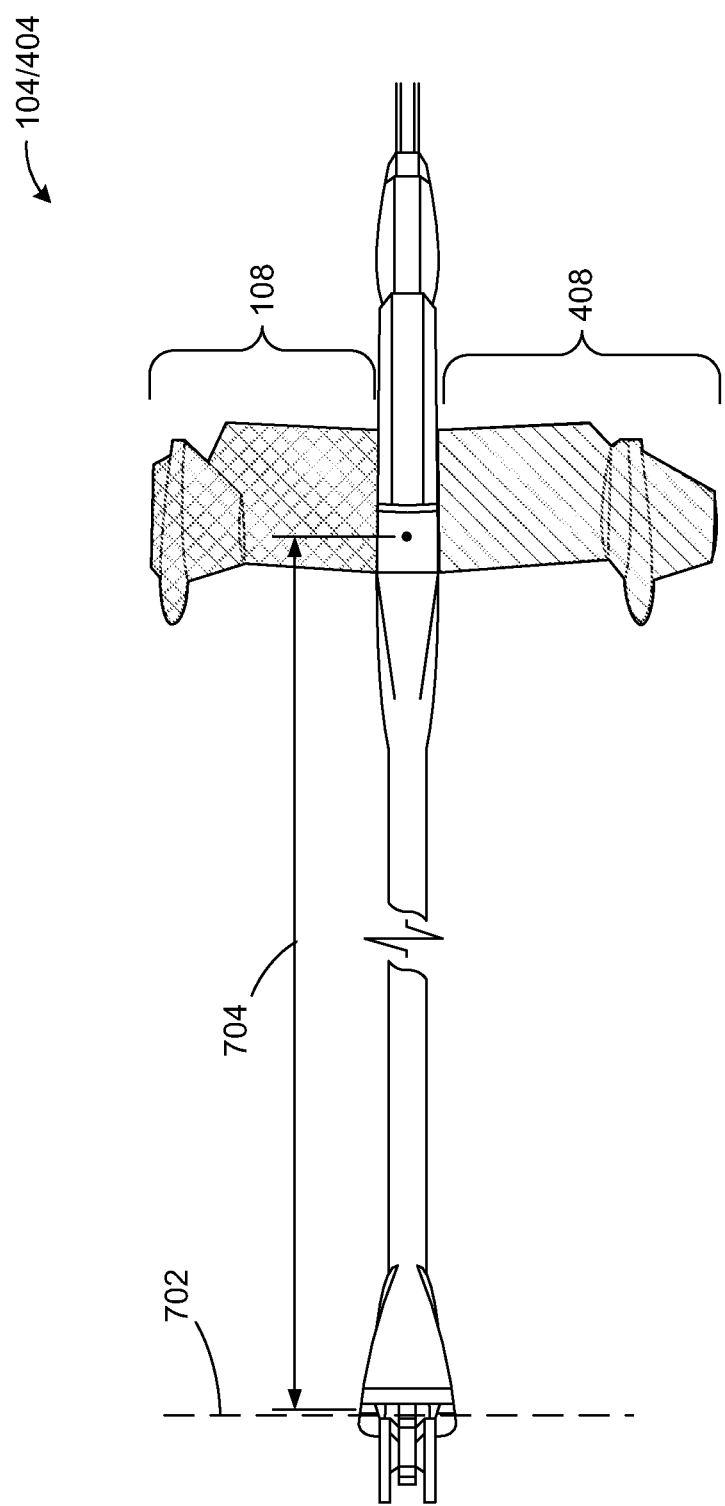
FIG. 7 is a top view of a refueling boom showing a comparison in horizontal surface area and corresponding pitching moment effects between a refueling boom with conventional vertical control surfaces and with vertical control surfaces according to various embodiments presented herein.

FIG. 6 shows a roll axis 600 around which the vertical control surfaces 412 roll the boom beam 406. This figure illustrates the increase in the rolling moment effectuated by the downward configuration of the vertical control surfaces 412 as compared to conventional vertical control surfaces 112. The vertical control surfaces 412 are depicted in solid lines according to embodiments described herein, while the conventional vertical control surfaces 112 are depicted in broken lines for comparative purposes. The aerodynamic center 602 of the conventional vertical control surface 112 is shown along with the aerodynamic center 604 of the vertical control surface 412. It should be appreciated that the locations of the aerodynamic centers 602 and 604 are approximated in the figure and that the precise locations would depend on the characteristics of the respective flight control surfaces.

As is readily known in the art, the rolling moment around the roll axis 600 may be approximated by the aerodynamic force applied at the aerodynamic center multiplied by the moment arm, or distance of the aerodynamic center from the roll axis 600. In this example, the rolling moment associated with the conventional vertical control surface 112 is the force applied at the aerodynamic center 602 multiplied by the length of the moment arm 606. Similarly, the rolling moment associated with the vertical control surface 412 is the force applied at the aerodynamic center 604 multiplied by the length of the moment arm 608. It can be seen that because the length of the moment arm 608 is greater than the length of the moment arm 606, for equivalent aerodynamic forces applied at the respective aerodynamic centers, the rolling moment associated with the vertical control surface 412 is greater than the rolling moment associated with the conventional vertical control surface 112. The result of this increased rolling moment is more control in the roll direction over conventional booms, and consequently, and expanded operating envelope.

Another benefit associated with the downward orientation of the vertical control surfaces 412 is the decrease in the torque moment applied to the boom beam 406. The conventional vertical control surfaces 112 induce a torque moment on the boom beam 406 from the aerodynamic forces applied at the aerodynamic center 602, which is a moment arm 612 from the boom beam axis 610 extending through the boom beam 406. As seen in FIG. 6, the downward extending vertical control surfaces 412 position the aerodynamic center 604 at a position proximate to the boom axis 610. This positioning significantly reduces or eliminates the moment arm 612, which significantly reduces or eliminates the torque applied to the boom beam 406 from the vertical control surfaces 412. As a result, the materials used to create the boom beam 406 may be lighter than those used to create the conventional boom beam 106.

Moreover, in addition to an increased rolling moment and decreased torque moment, the configuration of the vertical control surfaces 412 of the refueling boom 404 also increase the pitching moment around the pitch axis, further improving the control authority of the refueling system. Looking at FIG. 7, a top view of a refueling boom 104/404 is shown. The top half of the boom illustrates the horizontal projection of the area of the control surfaces 108 for a conventional refueling boom 104. The bottom half of the boom illustrates the horizontal projection of the area of the control surfaces 408 for the refueling boom 404. Because the area associated with the control surfaces 408 (represented by diagonal hatching) is larger than the area associated with the conventional control surfaces 108 (represented by cross-hatching), the aerodynamic force associated with the pitching moment around the pitch axis 702 may be larger as compared to a conventional refueling boom 104. Because the moment arm 704 does not change, but the force is increased, the result of the configuration of the vertical control surfaces 412 as compared to the conventional vertical control surfaces 112 is an increased pitching moment.

Figure 8:
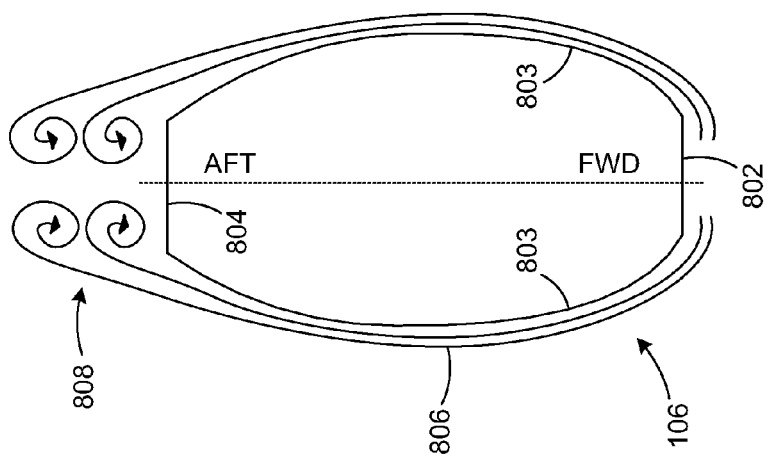
FIG. 8 is a cross-sectional view of a conventional refueling boom beam.

Turning now to FIG. 8, another embodiment of the disclosure will be described. As seen in FIG. 8, a cross-section of a conventional refueling boom beam 106 reveals a linear leading edge surface 802, a linear trailing edge surface 804, and connecting curved sidewalls 803. It should be appreciated that the linear leading and trailing edge surfaces 802 and 804, respectively, may not be completely flat, but do not aerodynamically transition into the curved sidewalls 803 to create an airfoil cross-sectional shape. Accordingly, as the boom beam 106 traverses through the ambient airflow 806, substantial drag is induced at the "flat" leading edge of the boom beam 106, and turbulent airflow 808 is created aft of the boom beam 106, further increasing the overall drag on the refueling beam 104 and tanker aircraft 102.

Figure 9B:
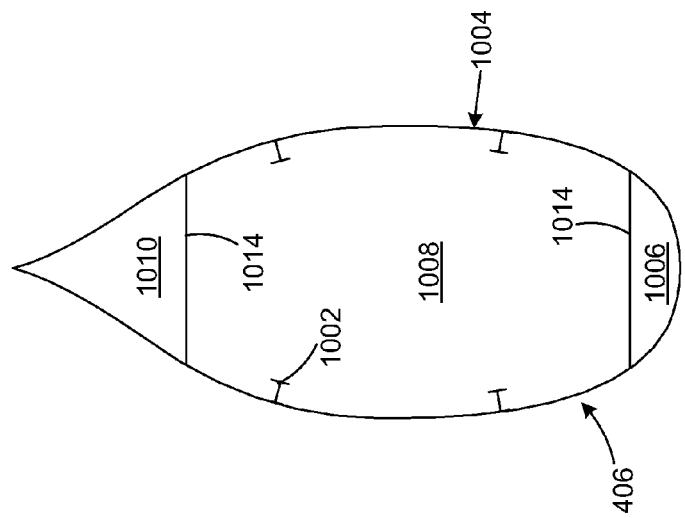
FIG. 9B is a cross-sectional view of a refueling boom beam with a continuous outer surface and symmetrical airfoil shape according to various embodiments presented herein.
Figure 9A:
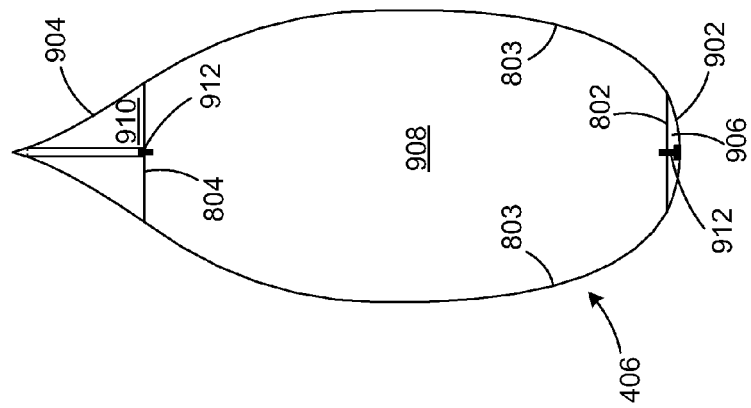
FIG. 9A is a cross-sectional view of a refueling boom beam with leading edge and trailing edge fairings according to various embodiments presented herein.

In contrast, two embodiments of the present disclosure are shown in FIGS. 9A and 9B, each of which provide for a symmetrical airfoil cross-sectional shape of the boom beam 406 in order to minimize the drag induced by the boom. It should be appreciated that the cross-sectional shapes shown in FIGS. 9A and 9B are cut from a plane parallel to the ambient airflow when the refueling boom is configured in a deployed configuration. The first embodiment is shown in FIG. 9A and is created by retrofitting or modifying the conventional boom beam 106 shown in FIG. 8 to create the boom beam 406 having an aerodynamic cross-sectional shape. The cross-sectional shape of an airfoil shown in FIG. 9A is created by installing a leading edge fairing 902 and a trailing edge fairing 904 to the linear leading edge surface 802 and to the linear trailing edge surface 804, respectively, of the existing boom beam 106. Each fairing is shaped to blend with the exterior curved sidewalls 803 to create the desired airfoil shape. The fairings may be constructed from metal, composite, or any other suitable materials and may have a hollow or honeycomb interior structure.

It should be appreciated that the cross-sectional shapes shown in FIGS. 8, 9A, and 9B are shown for illustrative purposes only. In practice, the boom beams 106 and 406 may have any cross-sectional shape and features. The leading edge fairing 902 and trailing edge fairing 904 are shaped accordingly to create an outer surface of the boom beam 406 with improved aerodynamic characteristics to decrease the corresponding drag while the boom is deployed or while stowed. The fairings may be installed using any number and type of fasteners 912 or any other fixed or removable securing means. Rubber or other flexible types of gaskets may be used between the fairings and the boom beam 106 to minimize wear between the components.

Grooves may be cut longitudinally into the boom beam 106 at the junction of the curved sidewalls 803 with the linear leading and trailing edge surfaces 802 and 804, respectively, to accommodate a flange on the fairings (not shown) in order to facilitate a conformal fit between the fairings and boom beam 106. When installed, the boom beam 406 may be divided into a sealed or unsealed leading edge chamber 906, interior chamber 908, and trailing edge chamber 910. The applicable fuel system components, control surface components, and boom extension hardware and associated electrical systems are housed within the interior chamber 908 and are not shown in the various figures.

The second embodiment corresponding to the creation of an aerodynamic boom beam cross-sectional shape is shown in FIG. 9B. In this embodiment, rather than attaching fairing to the existing boom beam 106, a new boom beam 406 is created from a single piece of metal, composite, or other suitable material according to the desired cross-sectional shape. The boom beam 406 may be created as a composite supported shell structure that has a seamless, continuous exterior surface 1004. The composite structure may be created with bulkheads 1014 for structural support, which also divides the boom beam 406 into a leading edge chamber 1006, and interior chamber 1008, and a trailing edge chamber 1010. Stiffeners 1002 may also be incorporated for structural support and/or to serve as rails or supporting members for the applicable fuel system components, control surface components, boom extension hardware and/or associated electrical systems.

Figure 10B:
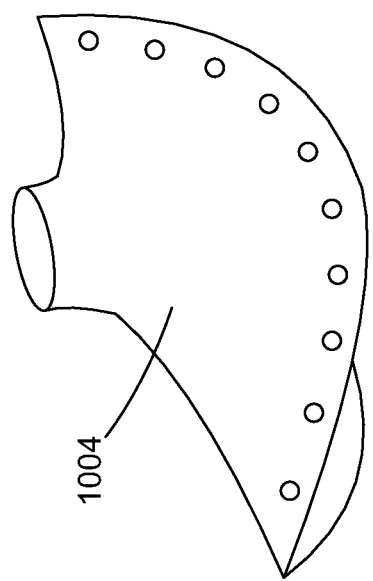
FIGS. 10A and 10B show perspective views of a portion of a refueling boom with a snubber fairing, and of the snubber fairing, respectively, according to various embodiments presented herein.
Figure 10A:
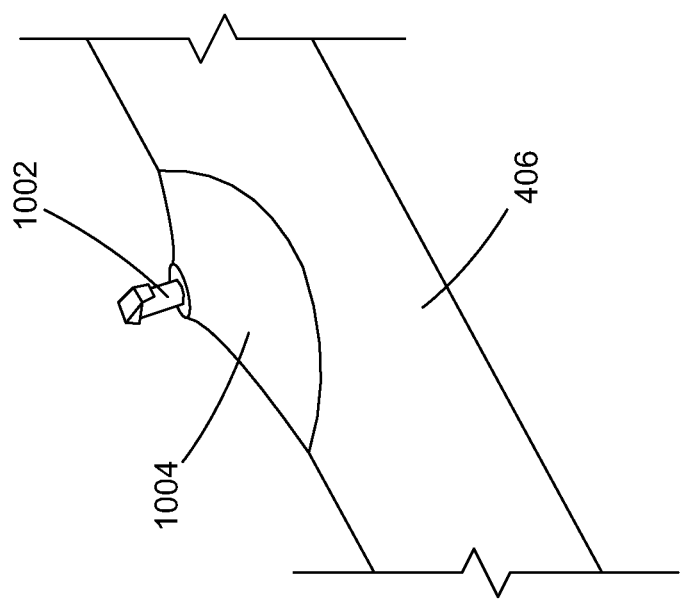

Turning now to FIGS. 10A and 10B, an additional aerodynamic feature provided to reduce the drag associated with conventional refueling booms 104 will be described. Conventional refueling booms 104 commonly include a snubber device 1002. The snubber device 1002 is a type of shock absorber mounted on the boom beam 106 used to engage the fuselage when the boom is stowed in order to prevent excessive collisions of the boom with the tailcone of the aircraft. The snubber device 1002 may additionally provide a preload to the refueling boom 104 that assists in deployment of the boom.

However, the snubber device 1002 and the interface of the device with the boom beam 106 is a source of additional drag. According to embodiments described herein, this drag is minimized utilizing a snubber fairing 1004. The snubber fairing 1004 is an aerodynamically shaped cover that encompasses the interface between the snubber device 1002 and the boom beam 406, as well as a portion of the snubber device itself. The snubber fairing 1004 may be shaped to conform to the aerodynamic trailing edge of the boom beam 406 shown in FIGS. 9A and 9B. The snubber fairing 1004 may be removably attached with fasteners so that it may be removed for maintenance of the snubber device 1002.

Figure 11:
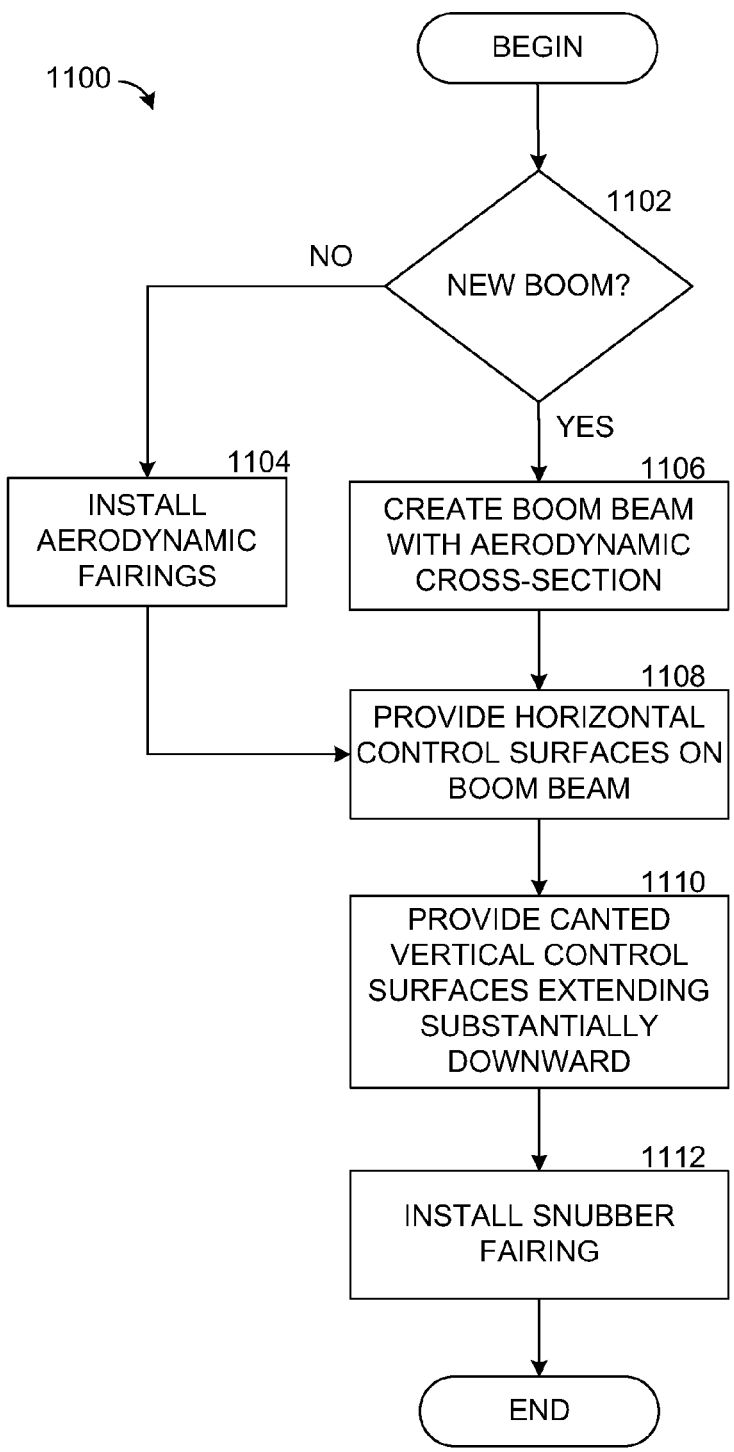
FIG. 11 is a flow diagram illustrating a method for providing an aircraft refueling boom according to various embodiments presented herein.

Turning now to FIG. 11, an illustrative routine 1100 for providing an aircraft refueling boom 404 will now be described in detail. It should be appreciated that more or fewer operations may be performed than shown in the FIG. 11 and described herein. Moreover, these operations may also be performed in a different order than those described herein. The routine 1100 begins at operation 1102, where a determination is made as to whether an existing refueling boom 104 is being modified to incorporate the concepts described above, or whether a new refueling boom 404 is being created. If an existing boom is being modified, then the routing 1100 proceeds to operation 1104, where a leading edge fairing 902 and trailing edge fairing 904 are installed as described above to create the desired symmetric airfoil cross-sectional shape of the boom beam 406. The routine 1100 continues to operation 1108 and proceeds as described below.

However, if at operation 1102, a new boom beam 406 is being created, then the routine 1100 continues to operation 1106, where the boom beam 406 is created from composite or other materials such that the exterior surface is continuous and shaped according to the desired airfoil cross-sectional shape. From operation 1106, the routine 1100 continues to operation 1108, where the horizontal control surfaces 410 are attached to the boom beam 406. As discussed above, the horizontal control surfaces 410 may be one or two components, which move together or independently as an entire surface or with integrated rudders.

At operation 1110, the canted vertical control surfaces 412 are attached to the opposing ends of the horizontal control surfaces 410. It should be appreciated that this operation may occur before the horizontal control surfaces 410 have been attached to the boom beam 406, during the creation of the horizontal control surfaces 410, or at any time during the creation and assembly of the refueling boom 404. The vertical control surfaces 412 are created and positioned such that the lower portion 416 extends downward towards the boom beam 406 farther than the upper portion 414 extends upwards. In doing so, the aerodynamic center 604 of the vertical control surfaces 412 is lowered to a position below the horizontal control surfaces 410, in contrast to the configuration of conventional control surfaces 108, resulting in the numerous advantages discussed above. From operation 1110, the routine 1100 continues to operation 1112, where the snubber fairing 1004 is installed around the snubber device 1002, and the routine 1100 ends.

It should be understood that the routine 1100 has been greatly simplified for illustrative purposes to highlight the applicable operations associated with the concepts and technologies described above. There are numerous operations involved with creating and installing a refueling boom 404 and associated components that have not been addressed herein.

Figure 12:
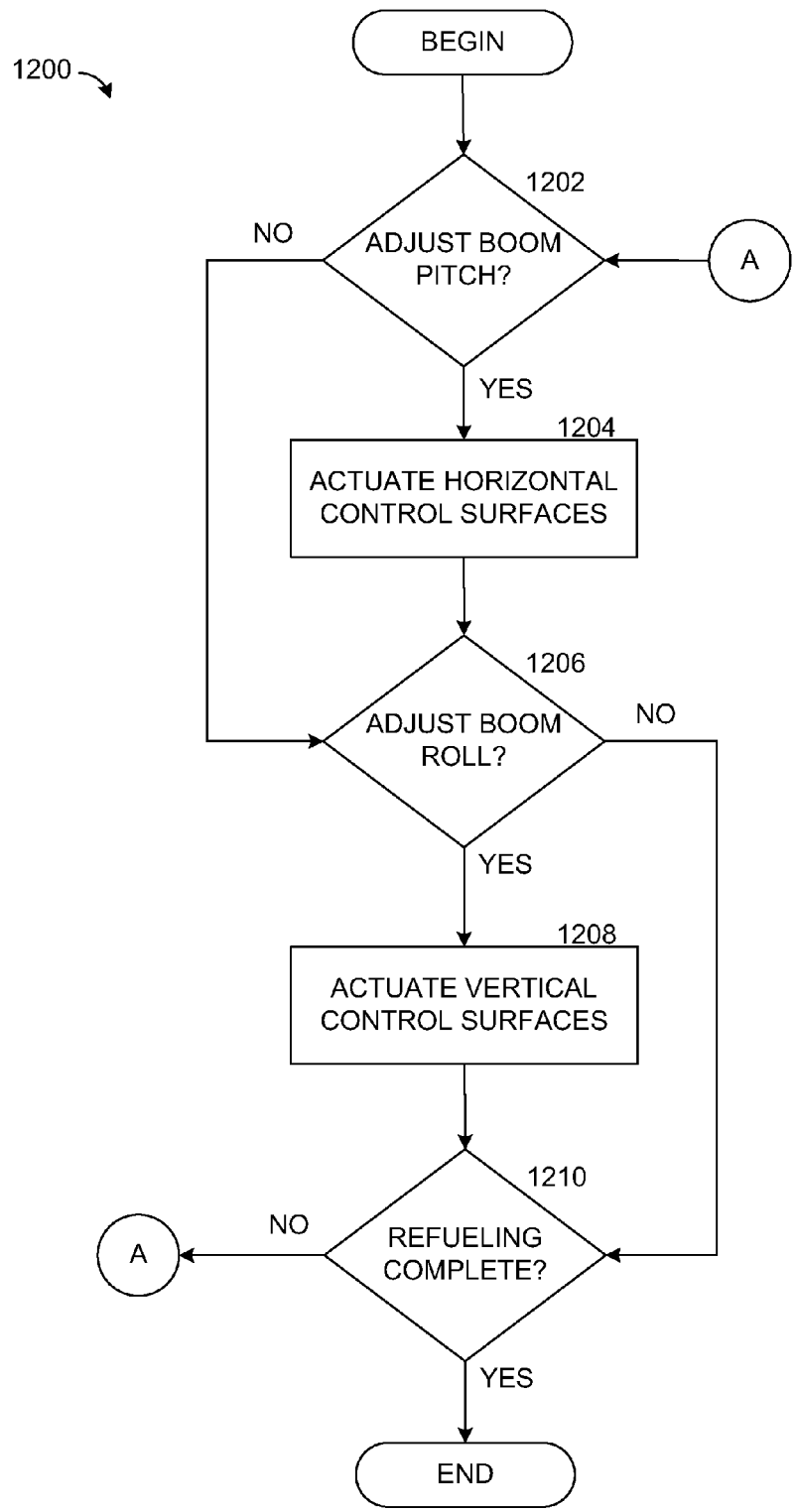
FIG. 12 is a flow diagram illustrating a method for controlling an aircraft refueling boom according to various embodiments presented herein.

FIG. 12 shows an illustrative routine 1200 for controlling an aircraft refueling boom 404. The routine 1200 begins at operation 1202, where a determination is made as to whether a change in pitch of the refueling boom 404 is desired. This determination is made according to whether or not a control input has been received corresponding to the horizontal control surfaces 410. If a change of pitch is not desired, the routine 1200 proceeds to operation 1206 and continues as described below. However, if a pitch control input has been received, then the routine 1200 continues to operation 1204, where the horizontal control surfaces 410 are actuated according to the received input. As a result of this pitch control surface actuation, the pressure of the ambient airflow around the horizontal control surfaces 410 is altered accordingly, and the refueling boom 404 is moved around a pitch axis.

From operation 1204, the routine 1200 continues to operation 1206, where a determination is made as to whether an adjustment to the positioning of the refueling boom 404 around a roll axis is desired. This determination is made according to whether or not a control input has been received corresponding to the vertical control surfaces 412. If a change of positioning around the roll axis is not desired, the routine 1200 proceeds to operation 1210 and continues as described below. However, if a roll control input has been received, then the routine 1200 continues to operation 1208, where the vertical control surfaces 412 are actuated according to the received input. As a result of this roll control surface actuation, the pressure of the ambient airflow around the vertical control surfaces 412 is altered accordingly, and the refueling boom 404 is moved around a roll axis.

From operation 1208, the routine 1200 continues to operation 1210, where a determination is made as to whether the refueling operation is complete. If the aerial refueling has not completed, then the routine 1200 returns to operation 1202 and continues as described above. If the aerial refueling operation has completed and the refueling boom 404 is stowed, then the routine 1200 ends. It should be appreciated that the pitch and roll operations described herein may occur concurrently depending on the control input provided by the boom operator.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A refueling boom, comprising:
   a boom beam;
   at least one horizontal control surface attached to the boom beam; and
   a pair of vertical control surfaces positioned on opposing ends of the at least one horizontal control surface, each vertical control surface comprising an upper portion projecting upwards from a top surface of the at least one horizontal control surface, and a lower portion projecting downward from a lower surface of the at least one horizontal control surface,
   wherein a length of the lower portion is greater than a length of the upper portion of each of the pair of vertical control surfaces.

2. The refueling boom of claim 1, wherein each vertical control surface is canted.

3. The refueling boom of claim 1, wherein the pair of vertical control surfaces are configured such that an aerodynamic center of each vertical control surface is below the lower surface of the at least one horizontal control surface.

4. The refueling boom of claim 3, wherein the aerodynamic center of each vertical control surface is positioned substantially within a plane comprising the boom beam.

5. The refueling boom of claim 1, wherein the boom beam comprises a symmetrical airfoil cross-sectional shape in a plane parallel to ambient airflow when the refueling boom is configured in a deployed configuration.

6. The refueling boom of claim 5, wherein the boom beam further comprises a leading edge chamber defined by a leading edge fairing attached to a leading edge of the boom beam, an interior chamber defined by a plurality of walls of the boom beam, and a trailing edge chamber defined by a trailing edge fairing attached to a trailing edge of the boom beam.

7. The refueling boom of claim 5, wherein the boom beam is configured such that an outer surface of the boom beam comprises a continuous surface having a symmetrical airfoil cross-sectional shape.

8. The refueling boom of claim 7, wherein the boom beam further comprises a leading edge chamber, an interior chamber comprising a plurality of stiffeners, and a trailing edge chamber.

9. The refueling boom of claim 1, wherein the boom beam comprises a snubber configured to contact the tanker aircraft when the refueling boom is positioned in a stowed configuration, and wherein the boom beam further comprises a removable aerodynamic fairing encompassing at least a portion of the snubber, the removable aerodynamic fairing configured to reduce drag created by exposure of the snubber to ambient airflow during flight.

10. A tanker aircraft, comprising:
    a fuselage;
    a fuel tank; and
    a refueling boom attached to the fuselage, the refueling boom fluidly linked to the fuel tank and operative to transfer fuel from the fuel tank to a refueling aircraft, wherein the refueling boom comprises a boom beam and a plurality of control surfaces operative to aerodynamically control movement of the boom beam, the plurality of control surfaces comprising:
       at least one horizontal control surface, and
       a pair of vertical control surfaces positioned on opposing ends of the at least one horizontal control surface, each vertical control surface comprising an aerodynamic center that is positioned below the at least one horizontal control surface.

11. The tanker aircraft of claim 10, wherein each vertical control surface comprises upper portion projecting above a top surface of the at least one horizontal control surface and a lower portion projecting below a bottom surface of the at least one horizontal control surface, and wherein a length of the lower portion is greater than a length of the upper portion.

12. The tanker aircraft of claim 11, wherein each vertical control surface is canted.

13. The tanker aircraft of claim 11, wherein each lower portion comprises a length that positions a lower tip edge of the vertical control surface above a plane that is tangential to a boom fitting fairing of the tanker aircraft when the refueling boom is positioned in a stowed configuration.

14. The tanker aircraft of claim 10, further comprising:
    a pair of horizontal stabilizers and a corresponding pair of elevators attached to the fuselage; and
    an auxiliary power unit (APU) installation location at a rear of the fuselage,
    wherein the refueling boom is configured such that when positioned in a stowed configuration, the pair of vertical control surfaces is positioned substantially below an APU exhaust flow when the tanker aircraft is on the ground and substantially below a turbulent flow field from the pair of horizontal stabilizers and corresponding pair of elevators when the tanker aircraft is in cruise flight.

15. The tanker aircraft of claim 10, wherein the boom beam comprises a symmetrical airfoil cross-sectional shape in a plane parallel to ambient airflow when the refueling boom is configured in a deployed configuration.

16. The refueling boom of claim 10, wherein the boom beam further comprises a leading edge chamber defined by a leading edge fairing attached to a leading edge of the boom beam, an interior chamber defined by a plurality of walls of the boom beam, and a trailing edge chamber defined by a trailing edge fairing attached to a trailing edge of the boom beam.

17. The refueling boom of claim 10, wherein the boom beam is created with a material shaped according to the symmetrical airfoil cross-sectional shape such that an outer surface of the boom beam comprises a continuous surface.

18. The refueling boom of claim 17, wherein the boom beam further comprises a leading edge chamber, an interior chamber comprising a plurality of stiffeners, and a trailing edge chamber.

\* \* \* \* \*